US006493547B1

(12) United States Patent
Raith

(10) Patent No.: US 6,493,547 B1
(45) Date of Patent: Dec. 10, 2002

(54) APPARATUS AND METHODS FOR PROVIDING USAGE INFORMATION IN WIRELESS COMMUNICATIONS SYSTEMS

(75) Inventor: Alex Krister Raith, Durham, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/313,033

(22) Filed: May 17, 1999

(51) Int. Cl.[7] .............................................. H04M 11/00
(52) U.S. Cl. ..................... 455/405; 455/407; 455/550
(58) Field of Search ................................ 455/405, 406, 455/407, 408, 409, 550

(56) References Cited

U.S. PATENT DOCUMENTS

| | | | |
|---|---|---|---|
| 4,264,956 A | 4/1981 | Delaney | 379/112 |
| 4,751,728 A | 6/1988 | Treat | 379/113 |
| 5,062,134 A | 10/1991 | Laird | 379/131 |
| 5,107,494 A | 4/1992 | Johnson et al. | 455/528 |
| 5,317,545 A | 5/1994 | Gray et al. | 368/4 |
| 5,524,145 A | 6/1996 | Parker | 379/197 |
| 5,684,861 A * | 11/1997 | Lewis | 455/405 |
| 5,751,798 A * | 5/1998 | Mumick | 479/114.24 |
| 5,862,471 A | 1/1999 | Tiedemann et al. | 455/406 |
| 5,881,105 A | 3/1999 | Balachandran et al. | 375/259 |
| 6,070,067 A * | 5/2000 | Nguyen | 455/407 |
| 6,246,870 B1 * | 6/2001 | Dent | 455/405 |

FOREIGN PATENT DOCUMENTS

| | | | |
|---|---|---|---|
| DE | 195 23 143 A1 | 9/1996 | |
| DE | 197 35 569 A1 | 2/1999 | |
| EP | 0 647 055 A1 | 4/1995 | |
| EP | 0 762 714 A2 | 3/1997 | |
| EP | 0 813 332 A1 | 12/1997 | |
| GB | 2 265 522 A | 9/1993 | |
| GB | 2 316 789 A | 3/1998 | |
| JP | 7-15564 | 1/1995 | |
| WO | 94/28670 | 12/1994 | .......... H04M/15/16 |
| WO | WO 95/28062 | 10/1995 | |
| WO | WO 99/23810 | 5/1999 | |

OTHER PUBLICATIONS

Abstract (English), German Patent No. DE 195 23 143 A1, Sep. 12, 1996.
Abstract (English), Japan Patent 7-15564, Jan. 17, 1995.
International Search Report, PCT/US00/10307, Aug. 28, 2000.

* cited by examiner

Primary Examiner—Vivian Chin
Assistant Examiner—James K Moore
(74) Attorney, Agent, or Firm—Myers Bigel Sibley & Sajovec

(57) ABSTRACT

Usage information, such as minutes remaining in a prepaid or monthly block or other unit of allocated services, is provided to a terminal by a wireless communications system, e.g., a system operative to communicate with terminals via terrestrial base stations and/or satellites. The system maintains a subscriber information database including current cumulative usage information for subscribers. The system automatically communicates current cumulative usage information for a subscriber in the subscriber information database to a terminal. The current cumulative usage information may be communicated in a variety of ways. For example, current cumulative usage information may be communicated to the terminal at registration of the terminal. Current cumulative usage information may also be communicated during or at the end of a call. A plurality of usage indications may be communicated to a terminal, a respective one of which is associated with a respective type of usage, such as voice call usage, data call usage, home area usage, roaming usage and the like. The terminal receives current cumulative usage information from the wireless communications system, and indicates current cumulative usage for a subscriber to a user based on the received current cumulative usage information. Different usages may be indicated in different forms, such as by different visual or auditory indicia. Related operating methods for wireless communications system and terminals are also described.

65 Claims, 14 Drawing Sheets

APPARATUS AND METHODS FOR PROVIDING USAGE INFORMATION IN WIRELESS COMMUNICATIONS SYSTEMS

RELATED APPLICATIONS

This application is related to application Ser. No. 08/888,229 filed Jul. 3, 1997 entitled Tariff Management Apparatus and Methods for Communications Terminals, assigned to Ericsson, Inc., and incorporated herein by reference in its entirety.

FIELD OF THE INVENTION

The present invention relates to communications systems, and more particularly, to apparatus and methods for providing information to users of wireless communications services.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 (superseded by IS-136) and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link 30 may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

Those skilled in the art will appreciate that "cells" may have configurations other than the omnidirectional cells 24 illustrated in FIG. 1. For example, the coverage areas conceptually illustrated as a hexagonally-shaped area served by a base station 26 may actually be subdivided into three sectors using separate directional antennas mounted at the base station 26, with the sector antenna having patterns extending in three different directions. Each of these sectors may itself be considered a "cell." As will be appreciated by those skilled in the art, other cell configurations are also possible, including, for example, overlaid cells, microcells, picocells and the like.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area. served by the system, or, as shown, the satellite may be designed such that it produces multiple minimally-overlapping beams 48, each serving distinct geographical overage areas 50 in the system's service region. The coverage areas 50 serve a similar function to the cells 24 of the terrestrial cellular system 20 of FIG. 1.

The use of wireless communications systems has rapidly grown, spurred by the availability of less expensive user terminals, the introduction of easier-to-understand billing plans, and an overall reduction in billing rates. These and other features have helped increase the worldwide population of wireless users to over 300 million.

In many countries, licenses to operate wireless communications systems are granted on a countrywide basis. However, in the United States and a few other countries, licenses to blocks of spectrum have been granted on a regional basis, resulting in the concepts of "home" and "roaming" areas. Although consolidation of the telecommunications industry has resulted in the concentration of these regional licenses into the hands of a smaller number of large operators, these artificial regional boundaries still exist. Their presence has made it difficult to provide seamless operation across the boundaries, often making wireless usage problematic for traveling users.

The cost of roaming in the United States has traditionally been relatively high. Unlike in many countries where the cost of a call is independent of where the call is placed or received, the cost of calls in the United States can be variable and unpredictable. A user may be charged a daily roaming charge when he activates himself on the roaming (visited) network. Long distance charges may be added for calls made to destinations outside the visited system's "local" area, which typically is defined differently than the coverage area of the system's operator. Daily charges may be applied when roaming in a network outside of one's home network. Because of these and other difficulties, users frequently turn off their terminals when not placing a call, particularly when traveling.

Techniques have been developed to deal with the aforementioned problems. For example, systems conforming to the GSM and ANSI 136 cellular standards provide for a Charge Rate Indication (CRI) that allows the system operator to inform a user of the per minute cost of a call the user has requested the system to place. In GSM, for example, this feature can be used to provide prospective estimates of charges to users that are traveling across national boundaries, with the charge estimate being provided in the user's home currency. A motivation for provision of CRI in ANSI 136 was to support wireless pay phone systems. The user of CRI can reduce cost uncertainty, but requires support in the cellular network. Generally, operators have little incentive to provide such information to users, as roaming charges represent a significant source of revenue.

Another approach to monitoring costs is to use a so-called "prepaid" package. In a typical prepaid package, a user purchases a fixed amount of wireless services, e.g., a fixed number of call minutes. In some systems, the user can call an operator to determine the number of prepaid minutes remaining on his or her package. The system may respond with a computerized voice message or an alphanumeric message that is transmitted to the user.

Other calling plans have been developed that remove some of the uncertainty involved in roaming. Many operators offer package rates, wherein a subscriber pays a fixed monthly charge for a predetermined number of minutes of calling during the month. When monthly usage exceeds the predetermined amount, additional minutes typically are provided at an increased, premium rate. In some plans, service may be provided on extended "nationwide" networks that, for example, cover major metropolitan areas of the United States. Minutes used within these extended networks may be included in the base package, but roaming minutes used outside of the extended network may be charged at a higher rate. Other plans, however, may not differentiate between home area and roaming calls in the discounted block, a feature particularly attractive to travelers who frequently use their cell phones outside of their home areas.

These plans have been facilitated by the development of system features that support Intelligent Roaming (IR). IR refers to a database that ranks roaming operators and that is downloaded to a user's phone from his or her home system. When outside of the user's home area, the phone seeks out and locks on to the highest ranked available roaming system in the downloaded database. Using this feature, the home system can direct its subscribers' terminals to seek low-priced systems with which the home operator has a roaming agreement, making a nationwide "one rate" plan economically viable. Industry trends toward greater consolidation among wireless operators are likely to increase the availability of such plans.

Notwithstanding trends toward rate simplification, there are still a variety of rate structures and plans in effect. The patchwork nature of wireless rates and plans can lead to uncertainty about the costs incurred in using wireless services. A user that fails to exercise care in the operation of his or her cell phone may incur substantial costs that can be avoided by employing intelligent calling practices. Accordingly, there is a need for wireless communications apparatus and methods that improve a subscriber's ability to monitor control communications costs.

SUMMARY OF THE INVENTION

In light of the foregoing, it is an object of the present invention to provide wireless communications apparatus and methods that can improve a subscriber's ability to monitor and control communications costs.

It is another object of the present invention to provide wireless communications cost monitoring and control apparatus and methods that are compatible with a variety of rate structures.

These and other objects, features and advantages are provided according to the present invention by wireless communications apparatus and methods in which current cumulative usage information associated with a subscriber, such as a number of minutes used, a number of minutes remaining in a prepaid or monthly calling block, or the like, associated with a subscriber is automatically communicated to a terminal, (e.g., without an inquiry from the terminal), and indicated to a user. The usage information is preferably communicated to the terminal using mechanisms used for normal system operation. For example, usage information may be communicated in a Registration Response message, in a control message communicated during a call, and/or in a Release message at call teardown. According to aspects of the present invention, a terminal can extrapolate current usage information from a previous usage indication when operating in a system that does not provide current usage information. According to other aspects of the present invention, the user may be supplied with a visual or auditory indication when indicated usage represents an extrapolation and/or when usage meets a predetermined criterion, e.g., when usage exceeds a predetermined value. According to other aspects of the invention, multiple usage indications can be provided to a terminal, a respective one of corresponds to a respective type of usage, e.g., home area usage, roaming usage, satellite system usage, terrestrial system usage, and the like.

According to an aspect of the present invention, usage information is provided to a terminal by a wireless communications system, e.g., a system operative to communicate with terminals via terrestrial base stations and/or satellites. The system maintains a subscriber information database including current cumulative usage information for subscribers. The system automatically communicates current cumulative usage information for a subscriber in the subscriber information database to a terminal.

The current cumulative usage information may be communicated in a variety of ways. For example, current cumulative usage information may be automatically communicated to the terminal at registration of the terminal. Current cumulative usage information may also be automatically communicated during or at the end of a call. Current cumulative usage information may be communicated to a terminal in at least one of a Registration Response message, a Control message, and a Release message.

According to yet another aspect of the present invention, a plurality of usage indications is communicated to a terminal, a respective one of which is associated with a respective type of usage. The usage indications may include, for example, a voice call usage indication, a data call usage indication, a home area usage indication, a roaming usage indication, a geographic area usage indication, a system type usage indication, a terrestrial system usage indication, a satellite system usage indication, a time of day usage indication, or a time of week usage indication. Information may be communicated in, for example, time or monetary units.

In other embodiments according to the present invention, a terminal receives current cumulative usage information from a wireless communications system, and indicates current cumulative usage for a subscriber to a user based on the received current cumulative usage information. The current cumulative usage information may be received, for example, at registration of the terminal, during a call or at the end of a call. The information may be received, for example, in a Registration Response message, a Control message, or a Release message.

According to another aspect, a terminal may receive a plurality of usage indications, a respective one of which is associated with a respective type of usage. The terminal may provided a plurality of usage indications to a user based on the received plurality of usage indications. The different usages may be indicated in different forms, such as by different visual or auditory indicia. Further, the terminal may convert received usage information, such as an absolute number of minutes used, to a new format, such a number of minutes remaining in a prepaid calling block. Presentation of usage information to a user may be controlled by a user input, such as by a keypad, trackball or similar device.

In yet another embodiment, a terminal may receive an indication from a wireless communications system that current cumulative usage information will not be communicated to the terminal, for example, on a point-to-point or broadcast channel. In response, the terminal may extrapolate usage, and indicate the extrapolated usage to a user. A distinctive display may be used to distinguish such extrapolated usage from actual usage information received from a wireless communications system. The terminal may also provide an indication to the user when a difference between an extrapolated usage and actual usage exceeds a predetermined threshold, or when an actual or extrapolated usage meets another predetermined criterion, such as a maximum number of minutes threshold.

Related operating methods for wireless communications system and terminals are also described. Improved wireless communications apparatus and methods can thereby be provided.

DETAILED DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The discussion herein refers to the communication of current cumulative usage information to a terminal, and presentation of such information to a user, typically a user operating the terminal. Current cumulative usage information may include, for example, accrued minutes or other time units of used wireless communications services, accrued monetary units of used wireless communications services, or other measures of communications services. Current cumulative usage information may also include, for example, measures of remaining unused services, such as minutes or dollars of a monthly or prepaid services block or other unit of allocated services. Current cumulative usage information may also include information identifying the usage, such as the type of usage or a time period to which the usage pertains. Such identifying information may include, for example, information identifying the usage as home area usage, roaming usage, terrestrial wireless system usage, satellite system usage, on- or off-peak usage, or the like. In addition, usage information may include other identifying information, such as information identifying the month, year, billing, or other period with which the usage is associated. As described in detail herein, any or all of this usage information may be communicated to a terminal and presented to user.

Figure 1:
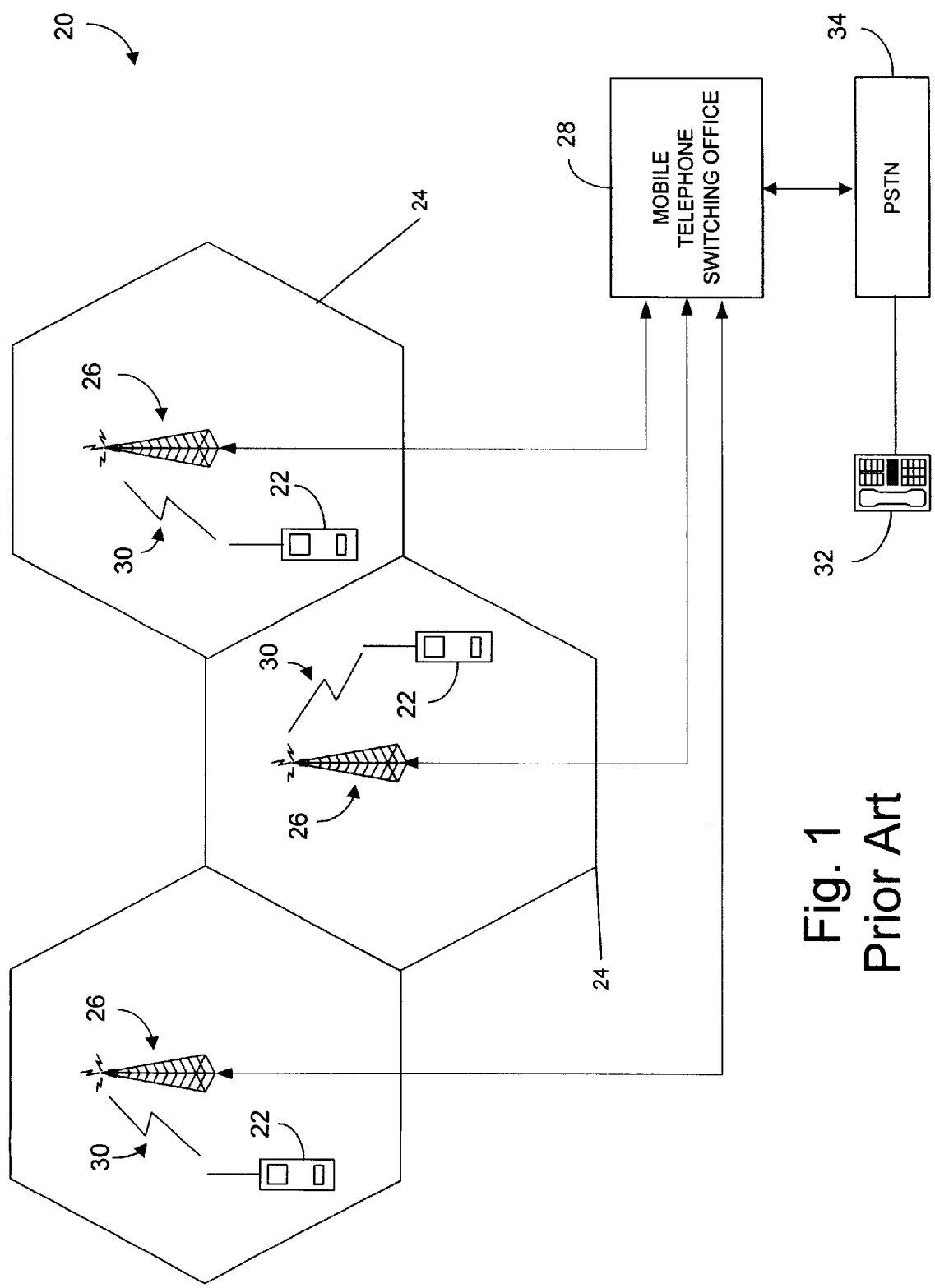
FIG. 1 is a schematic diagram illustrating an exemplary terrestrial wireless communications system according to the prior art.
Figure 2:
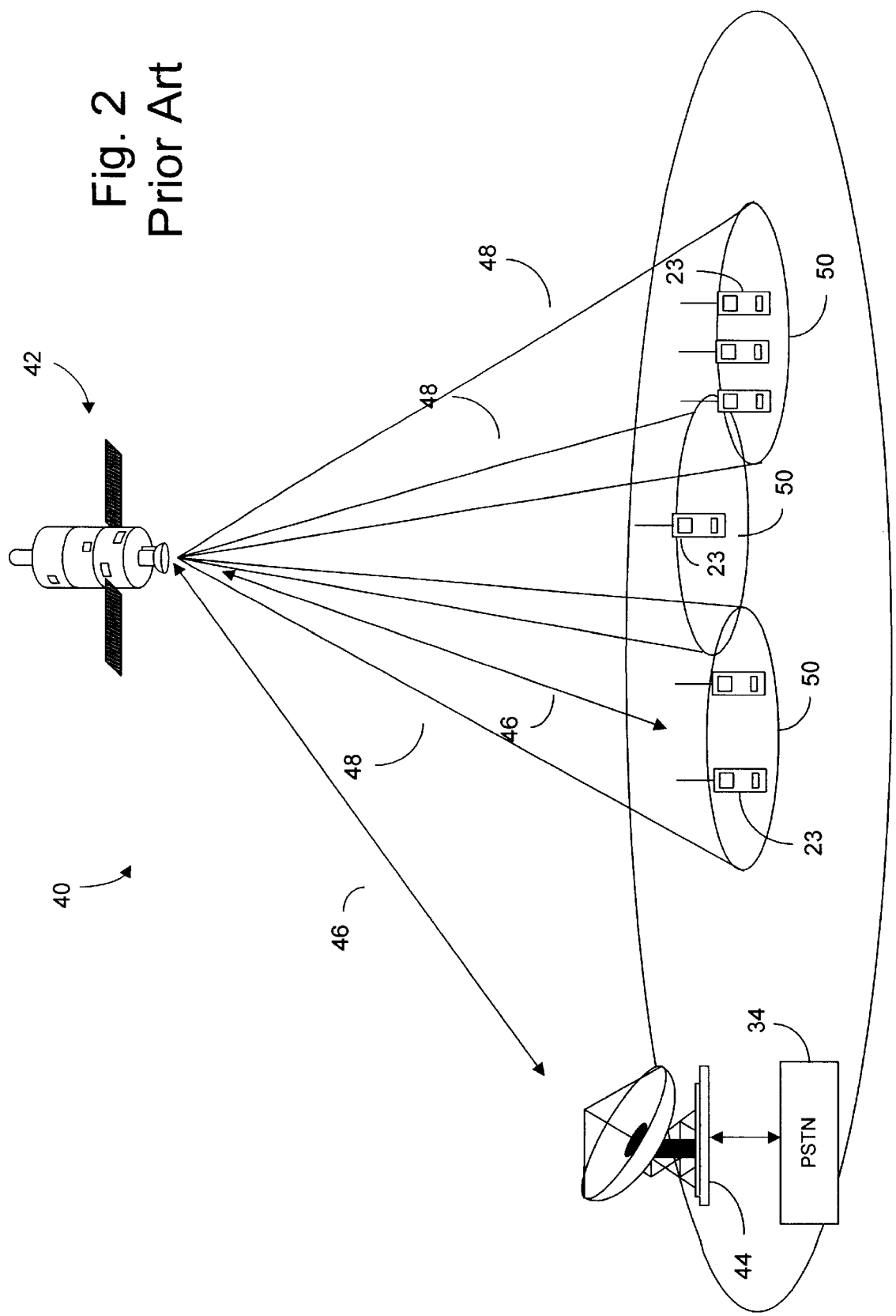
FIG. 2 is schematic diagram illustrating an exemplary satellite wireless communications system according to the prior art.
Figure 3:
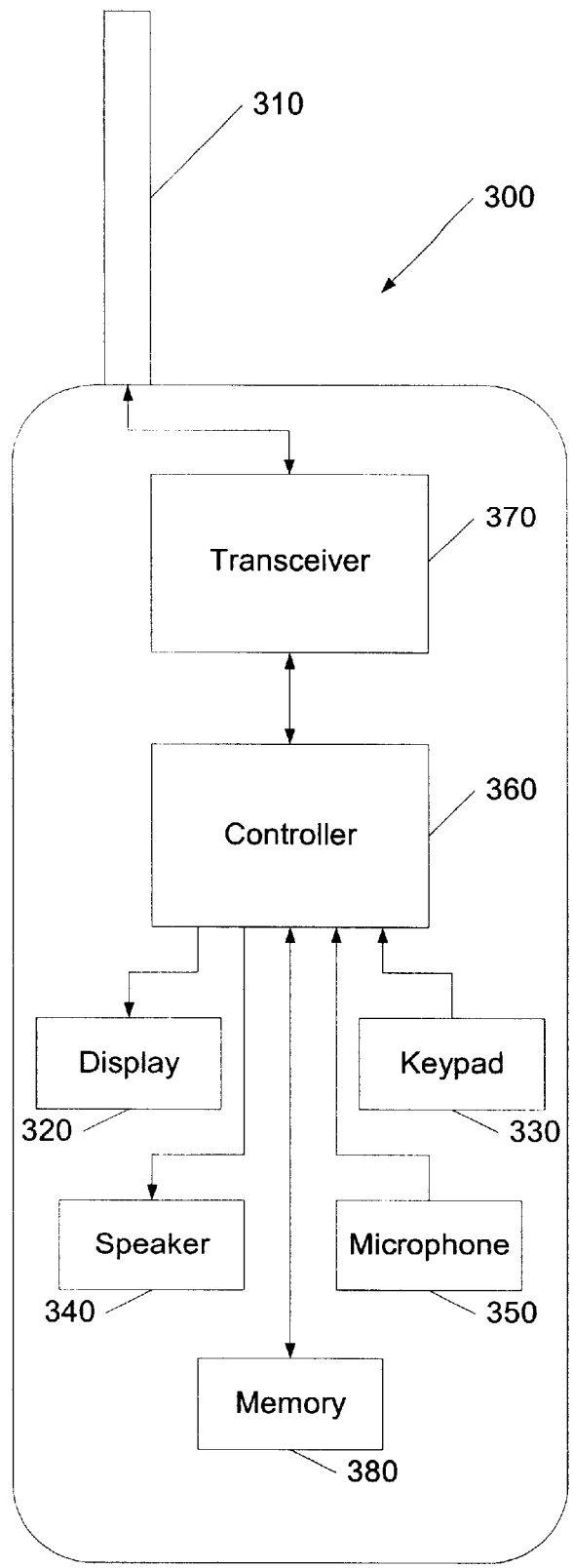
FIG. 3 is a schematic diagram illustrating an exemplary wireless terminal in which methods and apparatus according to the present invention may be embodied.

FIG. 3 illustrates a wireless terminal 300 in which apparatus and methods according to the present invention may be embodied. The terminal 300 includes an antenna 310 for receiving radio frequency (RF) signals. The terminal 300 provides a user interface including a display 320 for displaying information such as dialed numbers, short messages, directory listings and the like, and a keypad 330 for entering dialed numbers and accepting other user inputs for controlling the terminal 300. The user interface also includes a speaker 340 for producing audio signals and a microphone 350 for receiving voice information from a user. As shown, the terminal 300 also includes a controller 360 that controls and/or monitors the display 320, the keypad 330, the speaker 340, the microphone 350 and a radio transceiver 370 tied to the antenna 310, responsive to instructions and/or data stored in a memory 380. The controller 360 may comprise, for example, a microprocessor, microcontroller or other data processing device that is operative to load and execute computer instructions for performing functions described herein. According to aspects of the present invention, instructions are loaded into the memory 380 for execution on the controller 370, to control the transceiver 370 and display 320 to provide the usage communication and indications operations described herein, thus embodying apparatus according to the present invention an performing method steps according to the present invention.

Figure 4:
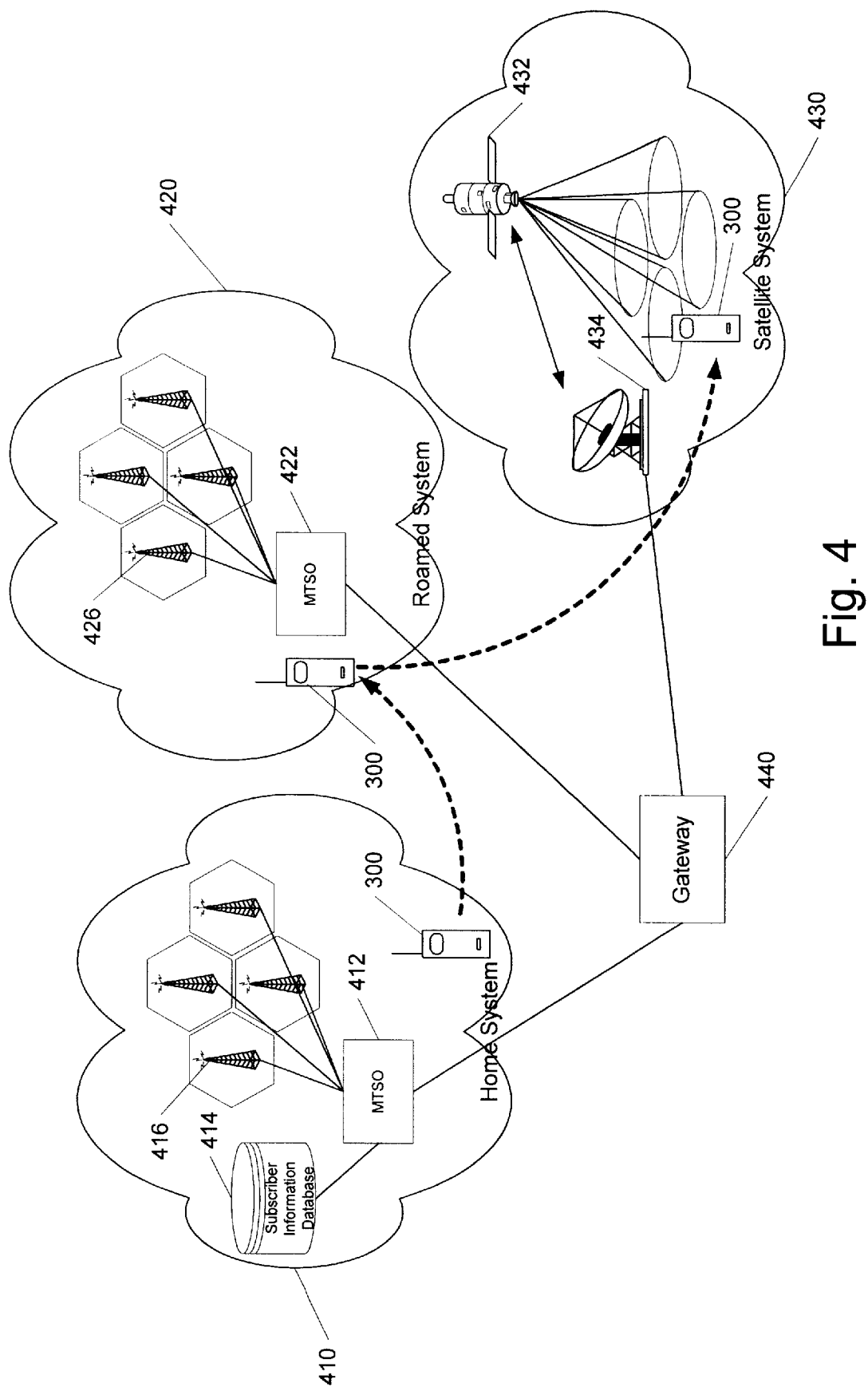
FIG. 4 is a schematic diagram illustrating an exemplary wireless communications infrastructure in which methods and apparatus according to the present invention may be embodied.

FIG. 4 illustrates an exemplary embodiment of a communications infrastructure in which methods and apparatus according to the present invention may be implemented. A home system 410 comprises means for communicating with a terminal 300, including, for example, base stations 416 and an MTSO 412 that provides radio resource and mobility management functions in the system 410. A subscriber information database 414 is associated with the MTSO 412, and includes usage information for subscribers. The subscriber information database 414 may, for example, be maintained on a server or other computer that maintains other system databases, such as a Home Location Register (HLR) or a Visitor Location Register (VLR).

It will be appreciated that when a terminal 300, associated with a subscriber to the home system 410, roams in a second system 420 (including an MTSO 422 and base stations 426), usage in the roamed system 420 may be billed to the subscriber's account in the home system 410, subject to conditions of the applicable roaming agreement. This may be achieved via a network 440 between the first and second systems 410, 420. If the terminal 300 is operative to communicate with both satellite and terrestrial wireless systems, usage in a satellite system 430 (including satellite 432 and earth station 434) may similarly be billed to the subscriber's account at the home system 410. The network 440 may be used, for example, for communication of information need to verify the identity of the terminal 300 and to authenticate requests received from the terminal 330. The network 440 may also be used for conveyance of usage information from the subscriber's home system 410 to the roaming system 420 for ultimate transmission to the roaming terminal 300, as described below.

The network 440 may comprise a number of different communications components including, but not limited to, devices such as Signal Transfer Points (STPs) or other network switches, or computer network components such as hubs, routers, bridges, and the like. The components may, for example, use telephone signaling protocols such as Switching System 7 (SS7), or other protocols, such as ATM (Asynchronous Transfer Mode) or TCP/IP (Transmission Control Protocol/Internet Protocol). The operations of such components are well known to those skilled in the art, and further description thereof is not needed to understand the nature of the present invention.

The infrastructure illustrated in FIG. 4 is offered for illustrative purposes, i.e., components of the systems 410, 420, 430 may be programmed or otherwise instructed to perform the usage communication operations described herein, thus embodying apparatus according to the present invention and performing method steps according to the present invention. It will be understood, however, that the present invention is not limited to the illustrated environment. Many other network configurations may be used with the present invention, including components other than those illustrated in FIG. 4 or described above.

FIGS. 5–7, 8A–B, and 9–10 are flowcharts illustrating exemplary operations according to various aspects of the present invention. It will be understood that blocks of the flowcharts of FIGS. 5–7, 8A–B, and 9–10, and combinations of blocks in the flowcharts, can be implemented by computer program instructions which may be loaded and executed on a computer or other programmable data processing apparatus, such as the controller 360 of the terminal 300 of FIG. 3 and/or similar components of a wireless communications system such as the systems 410, 420, 430 illustrated in FIG. 4, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowcharts of FIGS. 5–7, 8A–B, and 9–10 support combinations of means for performing the specified functions and combinations of steps for performing the specified functions. It will also be understood that each block of the flowcharts of FIGS. 5–7, 8A–B, and 9–10, and combinations of blocks therein, can be implemented by special purpose hardware-based computer systems which perform the specified functions or steps, or combinations of special purpose hardware and computer instructions.

Figure 5:
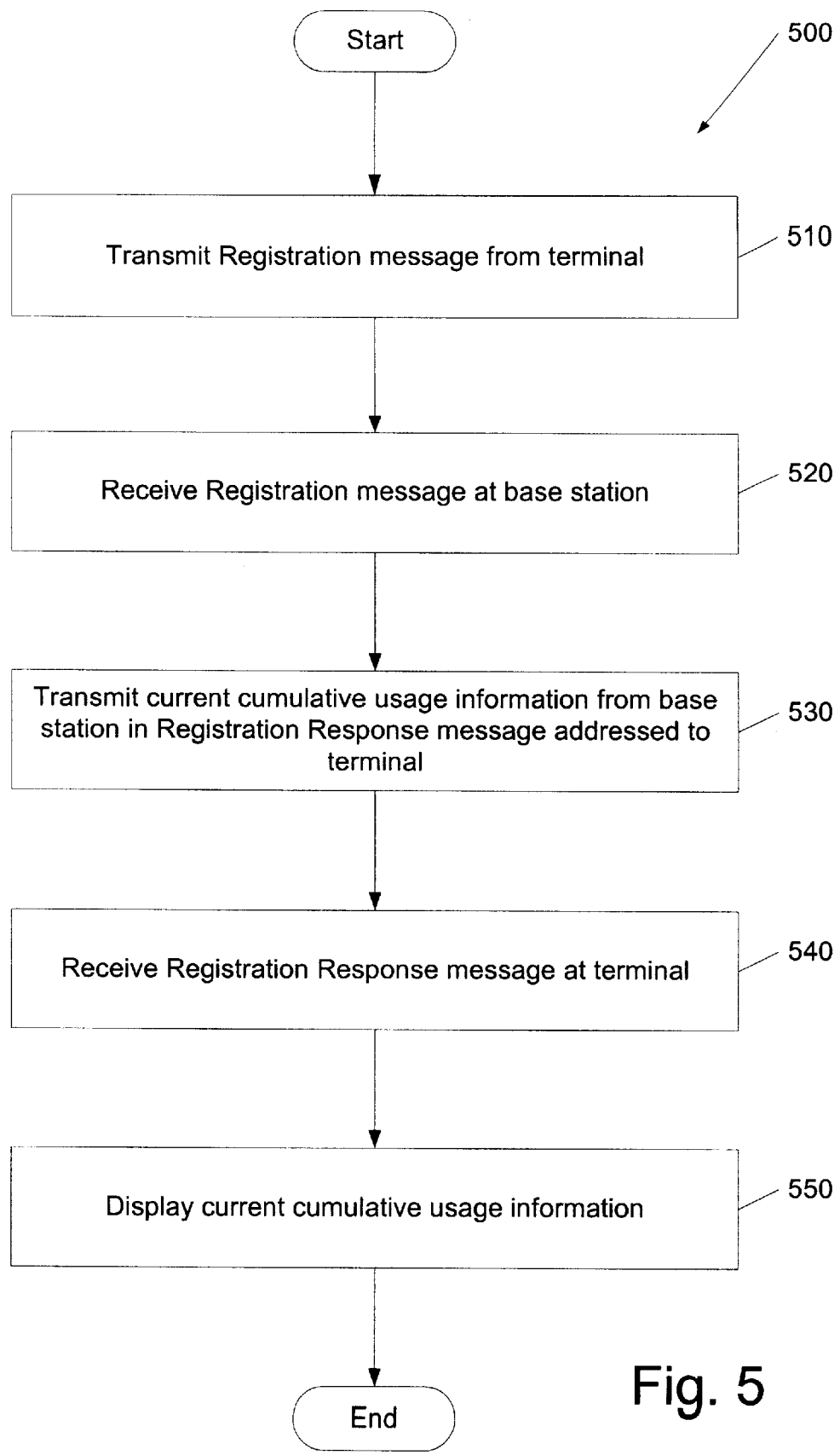
FIGS. 5–7, 8A–8B, and 9–10 are flowcharts illustrating exemplary operations for providing usage information according to aspects of the present invention.

FIG. 5 illustrates exemplary operations 500 for providing current cumulative usage information at a terminal according to an aspect of the present invention. By way of background, typical location updating procedures used in wireless communications systems use the MTSO and the HLR and VLR. When a terminal is switched on in a new location area, or it moves to a new location area or different operator's network, it typically must register with the network to indicate its current location. Typically, a Registration message is transmitted from the terminal to the MTSO via a base station (Blocks 510, 520), which records the location area information, and then sends the location information to the subscriber's HLR, e.g., via an interconnecting infrastructure such as the network 440 illustrated in FIG. 4. If the subscriber is entitled to service, the HLR typically returns a subset of the subscriber information needed for call control to the new MTSO, and sends a message to the old MTSO to cancel the old registration. According to the present invention, the subscriber information sent to the new MTSO may include current cumulative usage information for the subscriber retrieved, for example, from the subscriber information database 414 illustrated in FIG. 4.

According to the illustrated embodiment, the new MTSO sends Registration Response message to the terminal that includes the current cumulative usage information (Block 530). After receipt of the Registration Response message (Block 540), the terminal extracts the usage information and provides an indication of current cumulative usage to the user at the terminal (Block 550), e.g., by displaying a current cumulative usage value on the terminal's display.

Figure 6:
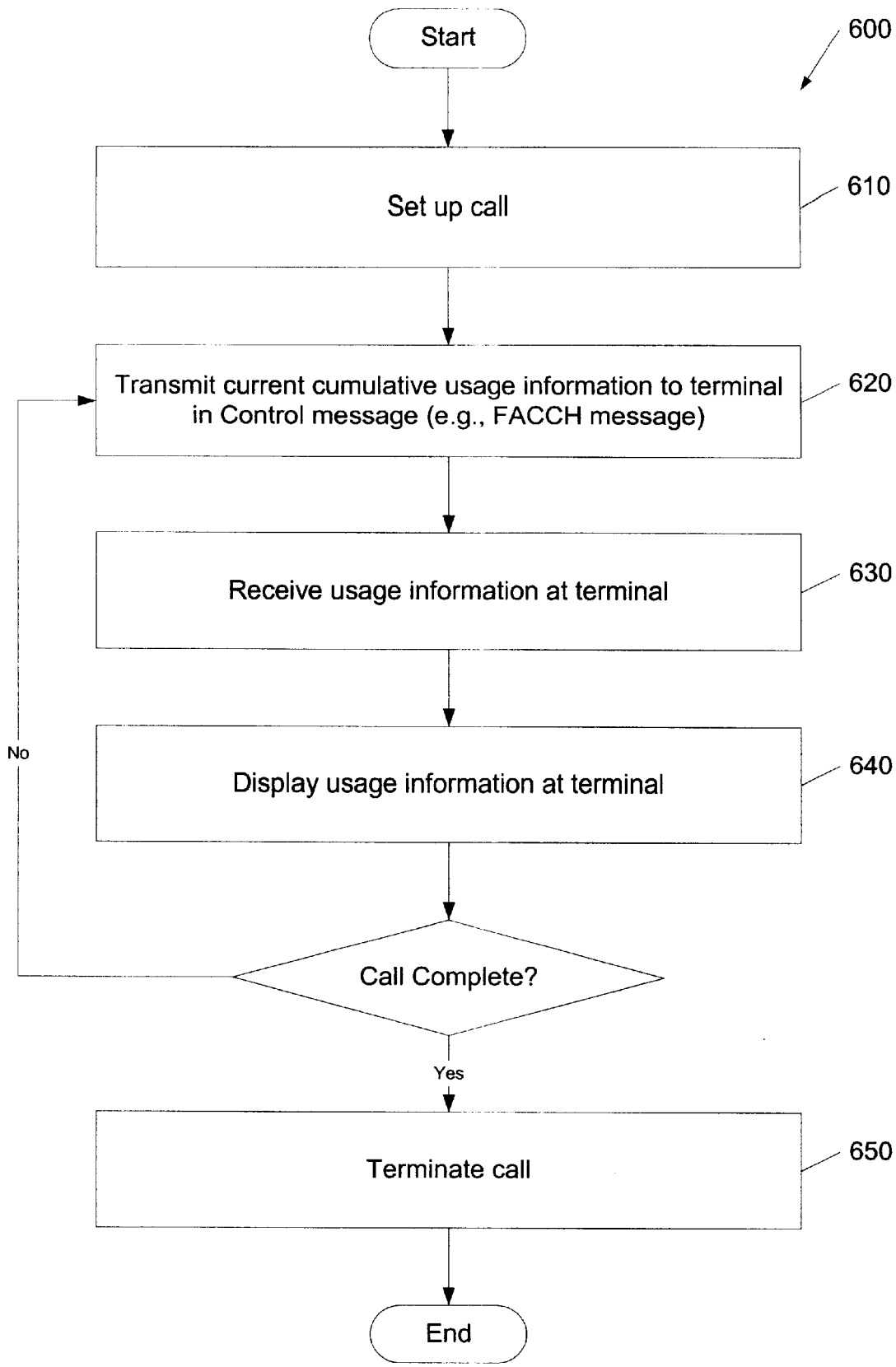

FIG. 6 illustrates exemplary operations 600 for providing current cumulative usage information at a terminal according to another aspect of the invention. A call is set up between a terminal and a wireless communication system, for example, in response to an access request or a paging acknowledgment communicated to the system from the terminal (Block 610). During the call, the system transmits current cumulative usage information to the terminal (Block 620). To avoid additional signaling overhead, the current cumulative usage information preferably is sent using a signaling message that would normally be sent during a call, such as a Fast Associated Control Channel (FACCH) message. The usage information is received at the terminal (Block 630), and displayed (Block 640). As the call continues, additional current cumulative usage information may be sent, received and displayed (Blocks 620, 630, 640), until the call is completed (Block 650). In this manner, a user at the terminal can receive an accurate indication of usage as the call proceeds.

Figure 7:
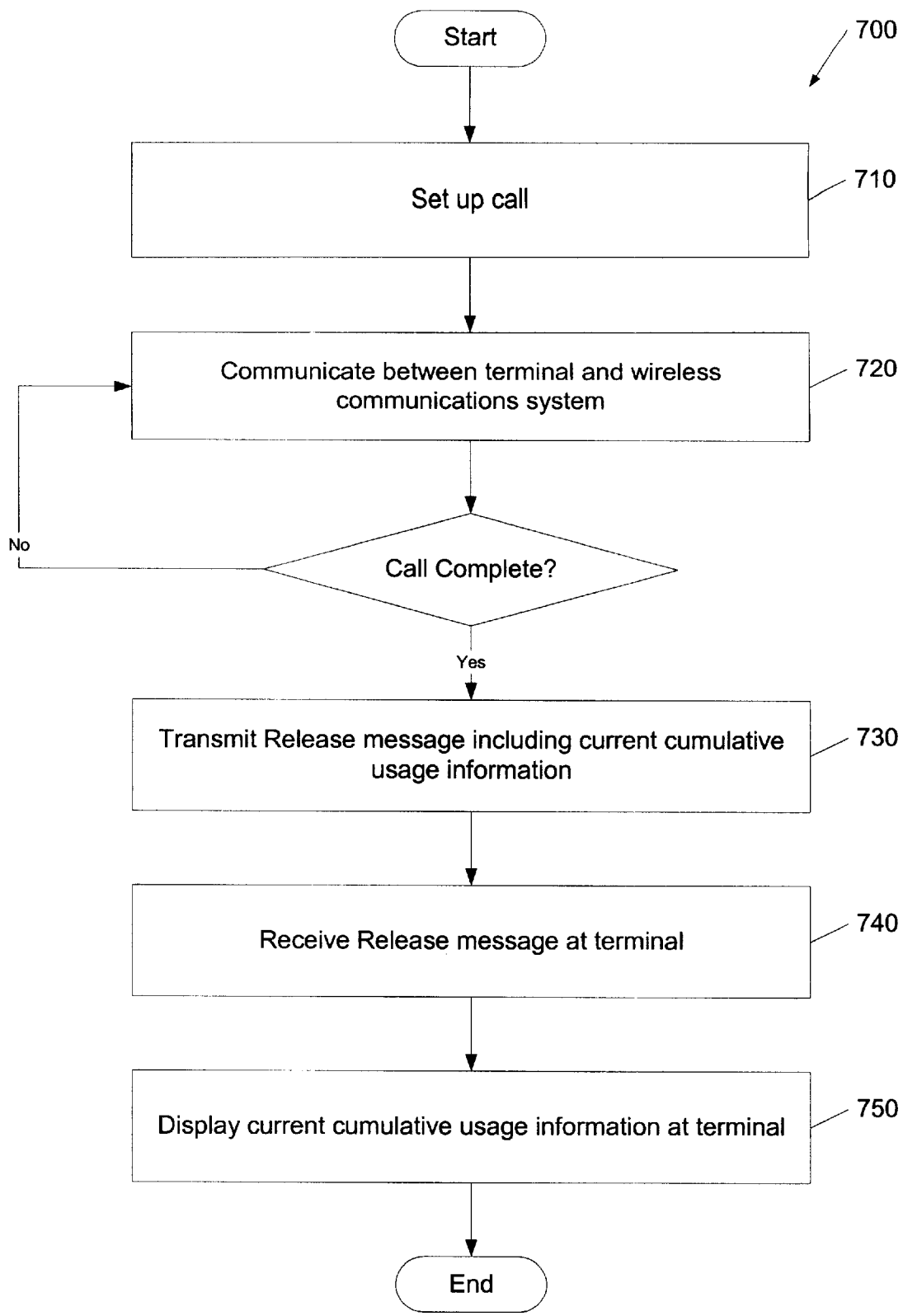

FIG. 7 illustrates exemplary operations 700 for providing current cumulative usage information at a terminal according to another aspect of the invention. A call is set up between a terminal and the system (Block 710). The terminal and system communicate during the call (Block 720), until the call is terminated. As part of the termination process, the system transmits a Release message, which includes current cumulative usage information (Block 730). The Release message is received by the terminal (Block 740), which extracts the usage information and displays it to the user (Block 750). Thus, the user receives and indication of current usage as of the end of the call.

It will be understood that although the operations of FIGS. 5–7 are shown in isolation, aspects illustrated in these figures may be combined. For example, current cumulative usage information may be sent to a terminal at registration, upon call setup, during a call, and at call completion. Current cumulative usage information may also be sent to a terminal at selected combinations of these times, e.g., during a call and at completion of a call.

Current usage information, however received, may be stored, for example, in a medium such as the memory 380 illustrated in FIG. 3. Alternatively, the current usage information may be stored in a nonvolatile, portable medium such as a so-called programmable "smart card" that the terminal is operative to access, such that a user can transfer current usage information from one terminal to another. Stored current cumulative usage information, including current cumulative usage information and/or current cumulative usage information that is extrapolated by the terminal (as described, for example, with reference to FIGS. 8A–B, below) may also be communicated from a terminal to a wireless communications system, e.g., using the transceiver 370 of the terminal 300 illustrated in FIG. 3.

Figure 8A:
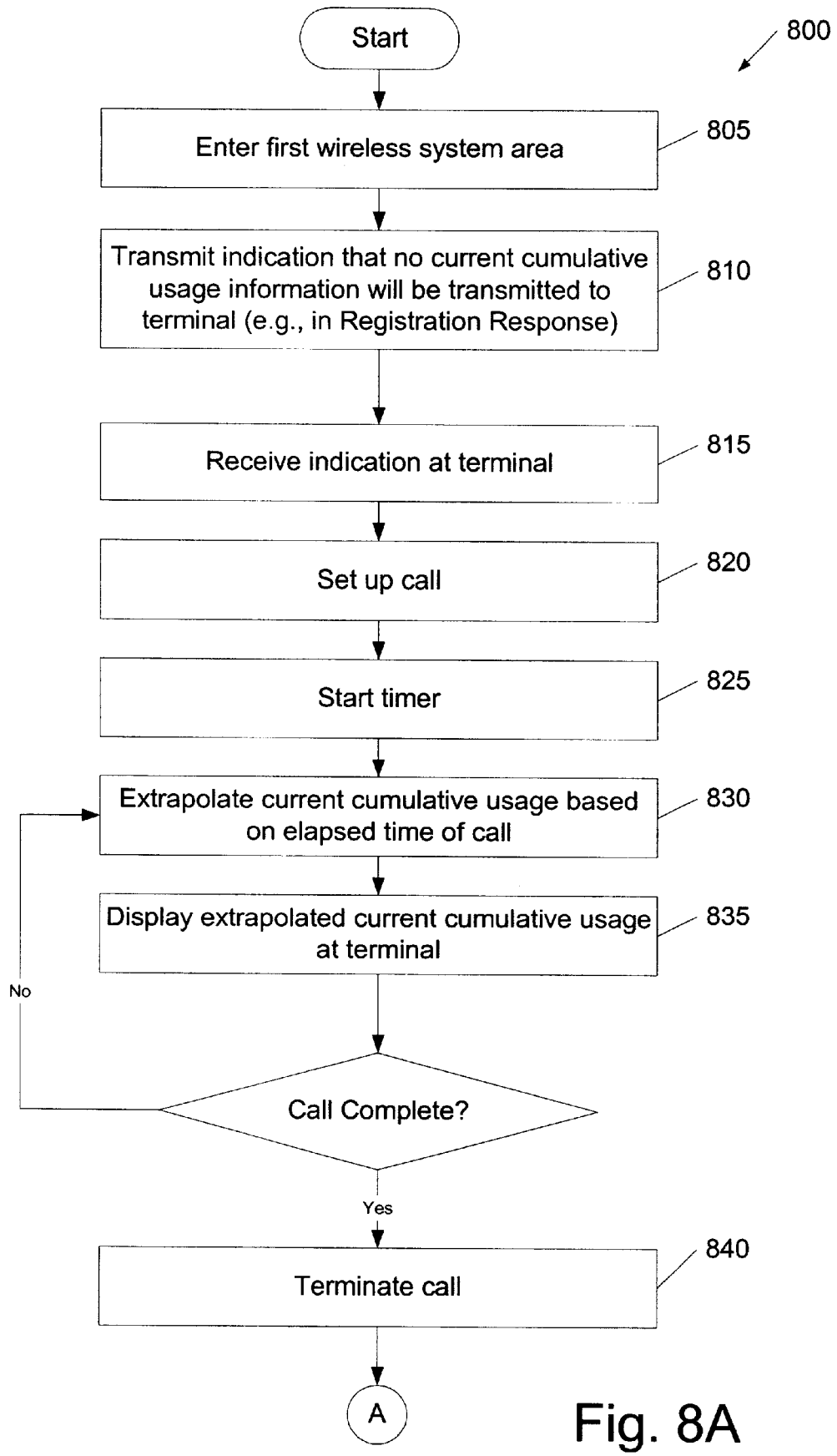
Figure 8B:
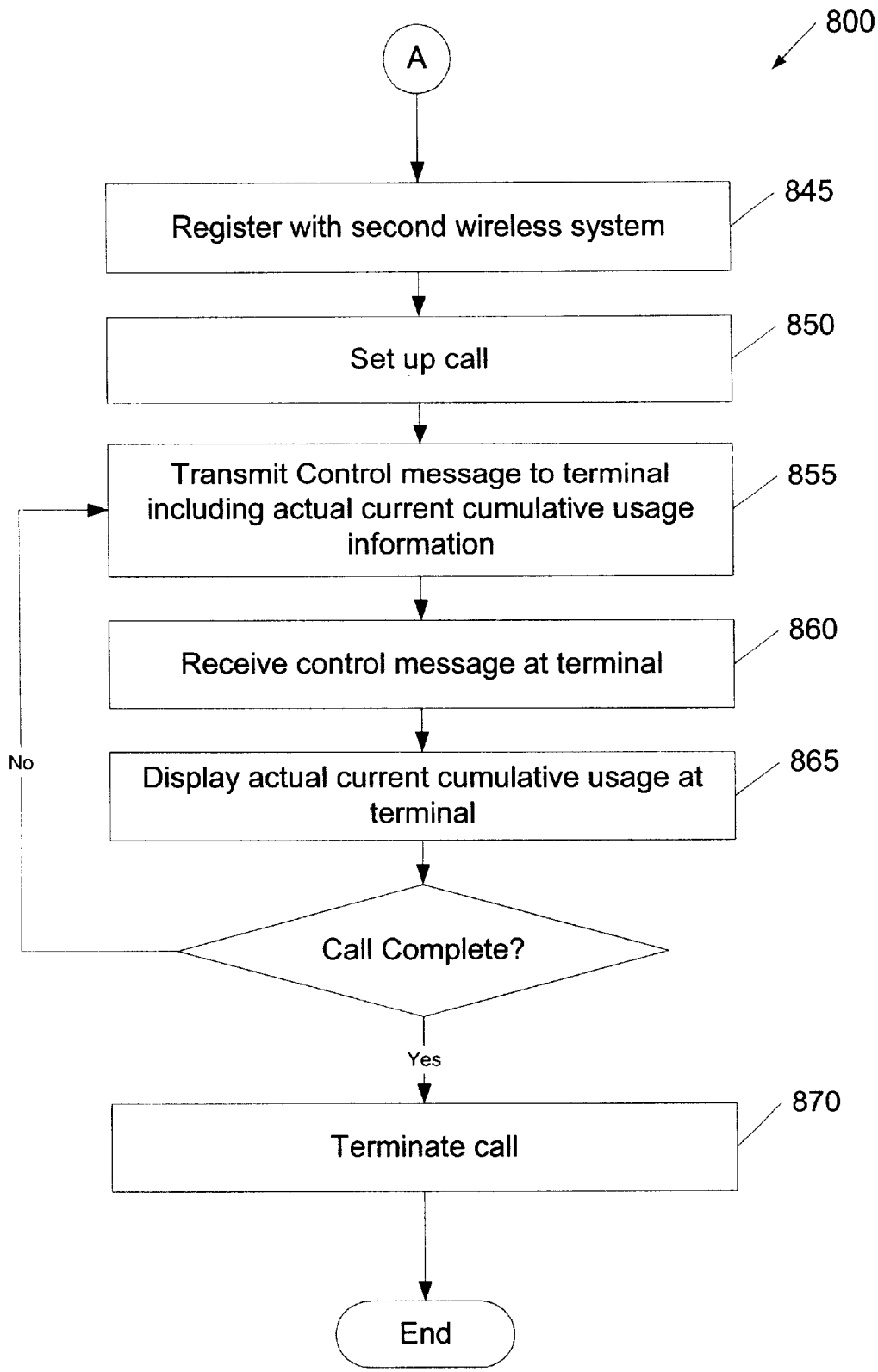

FIGS. 8A–B illustrates exemplary operations 800 for providing extrapolated current cumulative usage information during times that actual usage information is not available. A terminal registers with a first wireless system (Block 805). The first wireless system transmits a message, either on point-to-point or broadcast channel, that indicates that the system will not provide current cumulative usage information (Block 810), which is received at the terminal (Block 820). For example, the system may be incapable of transmitting usage information because of a lack of a suitable gateway to the subscriber's home system, or because of an equipment failure that temporarily prevents provision of such information.

Upon setup of a call, the terminal initiates a timer that measures elapsed time from the start of the call (Block 825). During the call, the terminal extrapolates current cumulative usage based on the measured elapsed time of the call (Block 830), with the extrapolated usage being displayed to the user (Block 835). The terminal may intermittently extrapolate and display current cumulative usage (Blocks 830, 835), until the call is terminated (Block 840). The extrapolation may include compensation for features which may affect the billing of the call, such as "first incoming minute free" features that are offered under some service plans. In response to receipt of an indication that the system is not supplying current cumulative usage information, a user at the terminal may be informed of this fact by providing, for example, an alphanumeric or iconic indication. Such an indication may also be provided, for example, by displaying usage information in a form that indicates that the displayed current usage information is being extrapolated instead of supplied by the system, as described in greater detail below.

Referring to again to FIG. 8B, after severing contact with the first system, the terminal may subsequently register with a second wireless system, one that supports providing of current cumulative usage information (Block 845). The terminal sets up a call in the new system (Block 850). During the call, the system sends a Control message (e.g., a FACCH message) that includes current cumulative usage information (Block 855), which is received by the terminal (Block 860). Based on the received current cumulative usage information, the terminal displays an indication of current cumulative usage to a user at the terminal (Block 865). Usage information may be transmitted, received and displayed (Blocks 855, 860, 865) until the call is terminated (Block 870).

Figure 9:
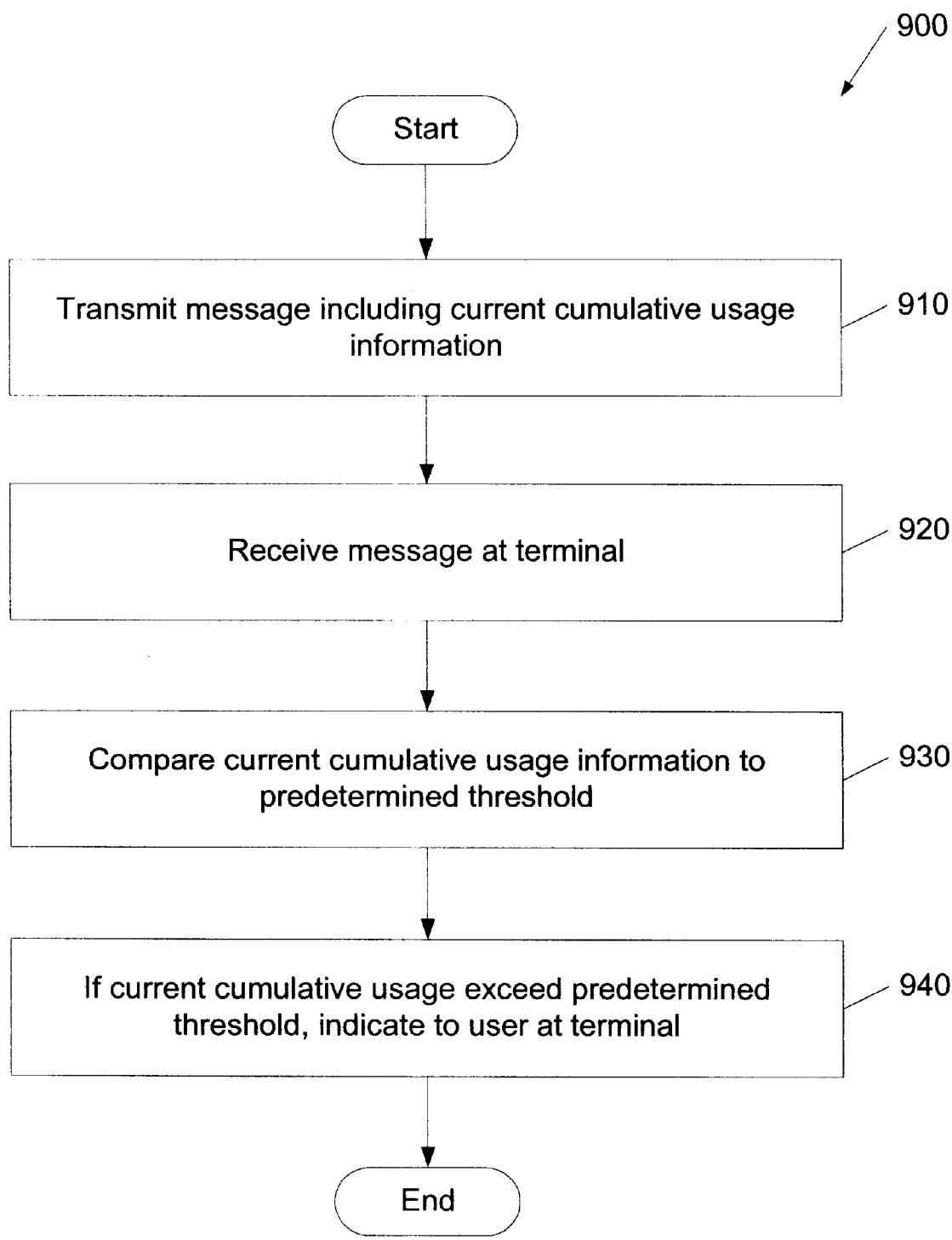

FIG. 9 illustrates exemplary operations 900 for determining when current cumulative usage meets a predetermined criterion, such as when usage exceeds the number of minutes in a subscriber's monthly billing plan. The system transmits a message including current cumulative usage information (Block 910). The terminal receives the current cumulative usage information (Block 920), and compares it with a predetermined threshold value (Block 930). If the current cumulative usage exceeds the predetermined threshold, the terminal provides an indication that the threshold has been exceeded (Block 940).

Predetermined criteria such at the threshold criterion described above may be provided to a terminal in number of ways. For example, criteria may be preprogrammed into the terminal at purchase or configuration of the terminal, or downloaded to the terminal by a wireless communications system. For example, criteria may be downloaded to a terminal in messages transmitted to the terminal during an operation such as registration, or may be provided to a terminal as part of an over-the-air-interface activation teleservice (OATS) procedure, e.g., a procedure whereby a "virgin" terminal is programmed for subscription to a wireless system by configuration messages sent by the wireless system to the terminal. Criteria, however received, may be stored, for example, in a medium such as the memory 380 illustrated in FIG. 3, or stored in a nonvolatile, portable medium such as a so-called programmable "smart card" that the terminal is operative to access.

The criteria may also take a number of different forms. For example, a threshold criterion may be provided to a terminal in the form of a number indicating the size of a monthly or prepaid calling block (e.g., a number of minutes or dollars), which the terminal may use for comparison with received or extrapolated usage information for generating an indication when the minutes in such a block have been exceeded. Information indicating the size of such a block may also be accompanied by other information such as a cost per minute charge for calls in the block and/or a cost per minute (e.g., a surcharge or premium rate) for minutes above the identified block threshold. More complex criteria may also be supplied, such a criteria applicable to more complex tariff structures that include, for example, multiple thresholds for different amounts of usage and different types of usage (e.g., on-peak use and off-peak use, home use and roaming use, or the like).

Figure 10:
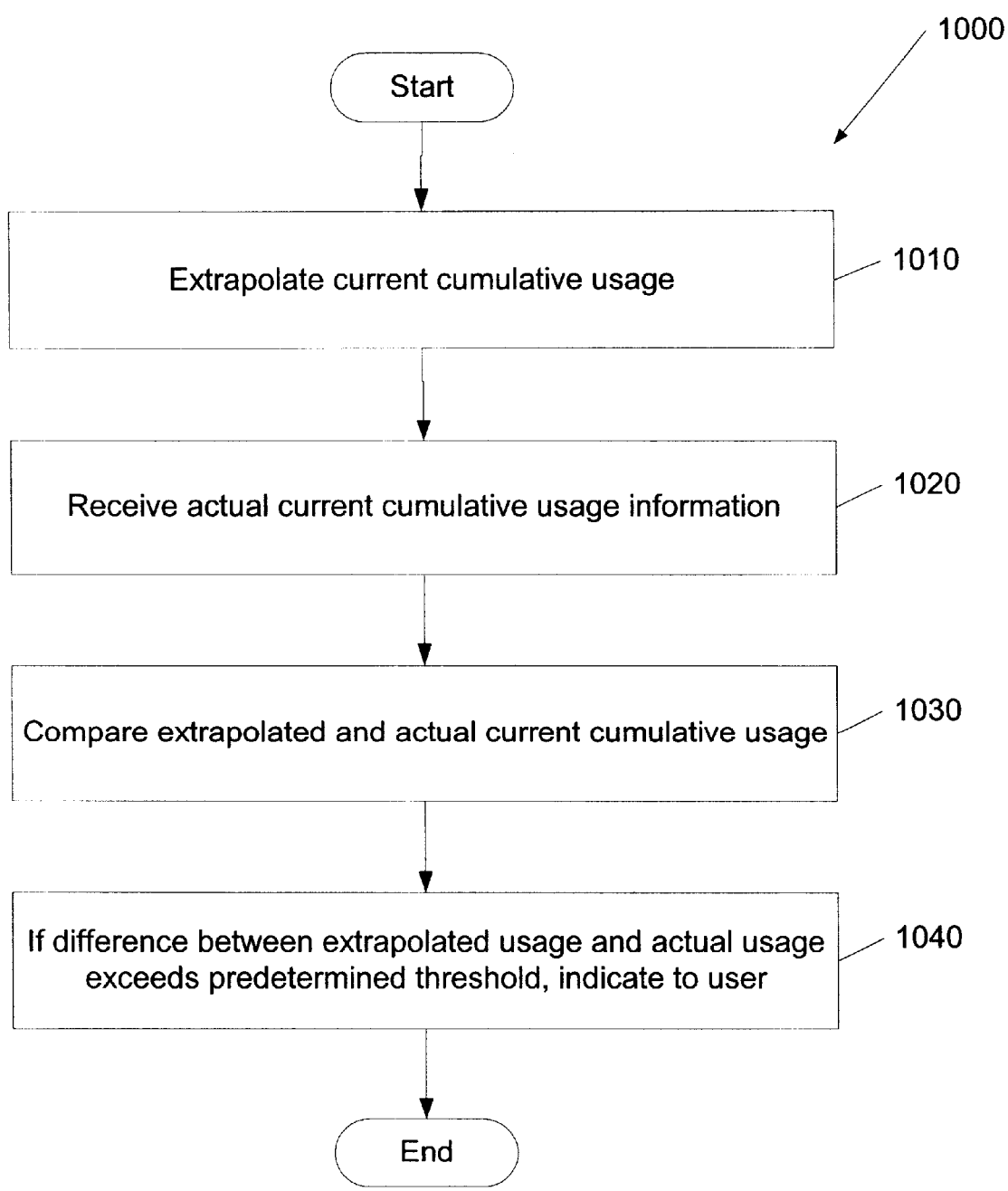

FIG. 10 illustrates yet another aspect of the present invention, illustrating exemplary operations 1000 for indicating to a user when an extrapolated current cumulative usage differs significantly from actual cumulative usage. A terminal extrapolates a current cumulative usage, e.g., from previously received actual cumulative usage information (Block 1010). Subsequently, the terminal receives updated current cumulative usage information (Block 1020). The terminal compares the newly received actual usage information with the extrapolated usage (Block 1030) and, if the difference between the two values exceeds a predetermined threshold, indicates the discrepancy to the user at the terminal (Block 1040). As with the usage threshold described in reference to FIG. 9, the discrepancy threshold may be preprogrammed into the terminal or provide to the terminal in a previously received message.

Provision of such a discrepancy indication may be valuable to subscriber, for example, that has been out of his or her home system for an extended period, extrapolating current cumulative use in systems that do not provide current usage information. Upon return to the home system, it may be desirable to provide such a subscriber with an enhanced indication of a large discrepancy between actual and extrapolated use, so that the subscriber is less likely, for example, to exceed a maximum number of minutes for a billing period. This feature may also be useful in helping the subscriber detect and track down accounting errors that may have occurred when the subscriber was using a "foreign" system. As with earlier-described aspects, an indication of a discrepancy between actual and extrapolated use may take the form of a variety of visual or auditory indicia.

A number of different techniques may be used to indicate current cumulative usage and associated information to a user. For example, although the operations of FIGS. 5–7, 8A–B, and 9–10 describe presentation of usage information in visual form, usage information may be provided in other forms, such as in an auditory form. Usage information may be displayed in an alphanumeric format, using a variety of units such as time units or monetary units, in iconic forms such as meters or histograms, or in other visual forms. Display of usage information may be suppressed, modified or otherwise controlled, for example, via a keypad of the terminal (e.g., the keypad 340 of FIG. 3), or by other means, such as a thumbwheel, trackball or glide strip, or by control signals provided to the terminal over a communications link.

Current cumulative usage may be presented in terms of an absolute measure of services, such as minutes used, number of short messages, number of data communications packets used or the like. Usage may also be indicated in the form of an amount of services remaining, such as the number of minutes left in a monthly or prepaid calling block or other unit of allocated services. Usage information may be similarly communicated to a terminal in these and other forms. The terminal may display the usage information in the received form, or may convert the received usage into a different format for display at the terminal. For example, a system may convey a number of minutes used to a terminal, and the terminal may convert this number of minutes used to a number of minutes remaining, and display the information in this format at the terminal. Additional usage information may also be communicated to a terminal and indicated to a user, such as usage charge rate information (e.g., price per minute for both base and premium portions of a rate plan). The terminal may also be operative to forecast anticipated charges based on the charge rate information.

Figure 11A:
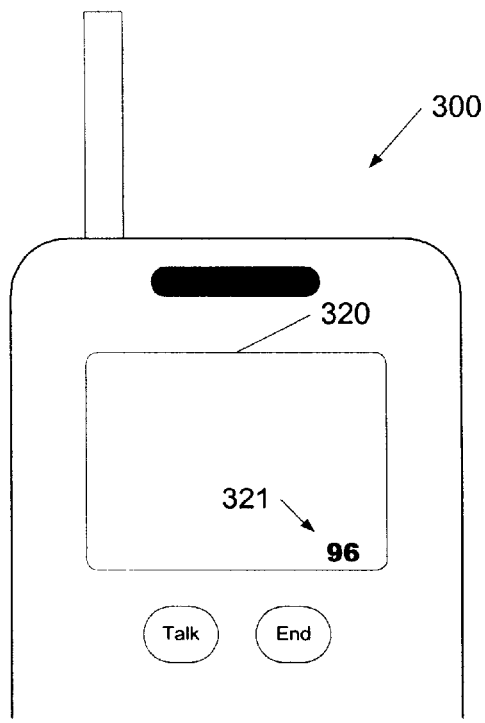
FIGS. 11A–11B and 12A, 12B illustrate exemplary displays of usage information in various embodiments of the present invention.
Figure 11B:
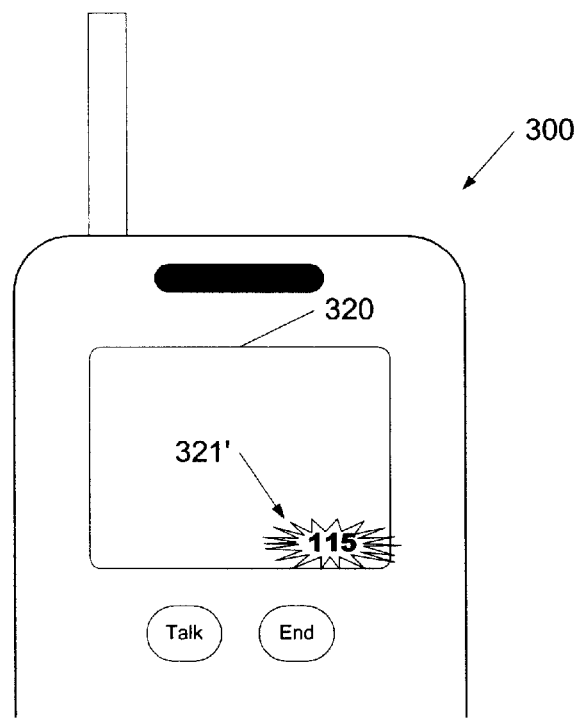

According to other aspects of the present invention, a user may be informed about the nature of the usage information provided, such as its source, the type of service to which the usage information pertains, the time or billing period with which the usage information is associated, and the like. For example, a user may be informed as to whether indicated current cumulative usage information is extrapolated or actual. As shown in FIGS. 11A–B, an actual value may be shown by a "normal" alphanumeric representation 321, while an extrapolated value may be indicated by a distinctive display such as a flashing alphanumeric representation 321'. A variety of other techniques can be used to distinguish between extrapolated and actual values, such as by displaying extrapolated and actual values in different fonts and colors, or by distinguishing actual and extrapolated usage by different combinations of visual and auditory indicia. Such techniques may also be used, for example, to indicate when a subscriber's usage has met other criteria, such as the exceeding of a predefined amount of usage as described in reference to FIG. 9.

Figure 12A:
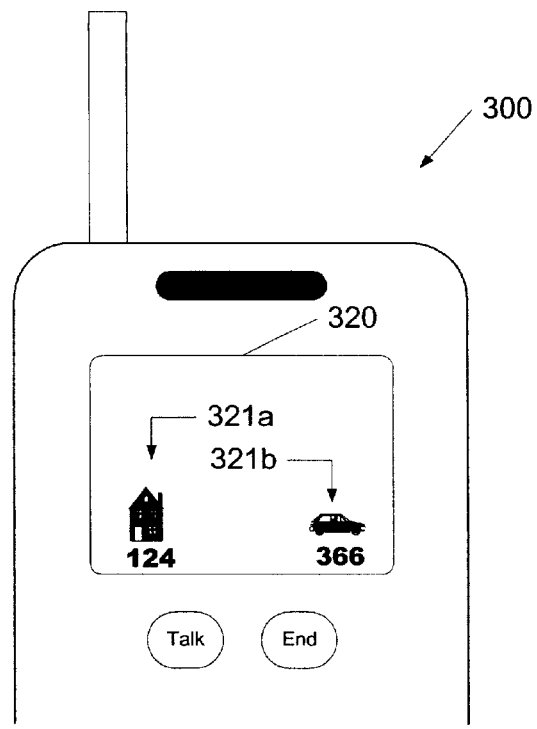
Figure 12B:
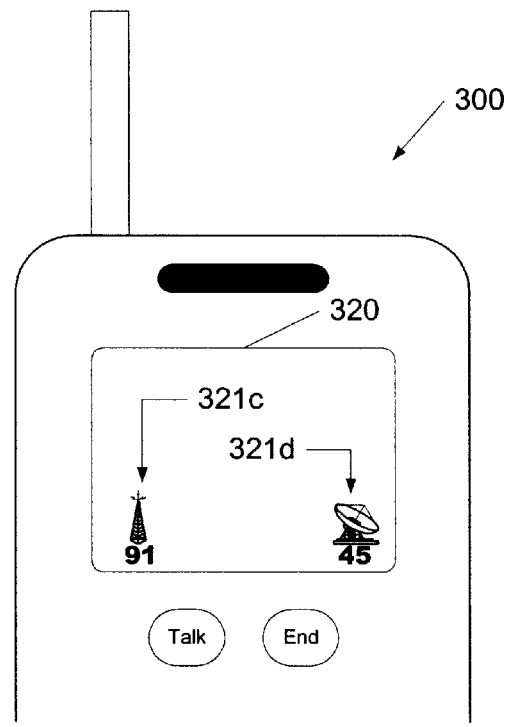

According to yet another aspect of the present invention, a wireless communications system may communicate usage information relating to multiple types of usages. For example, a system that provides both voice and data services may provide respective usage information for each type of service. Usage information communicated to a terminal may be categorized into, for example, home area usage and roaming usage, or may be categorized into respective usage in a respective one of a plurality of geographic or service areas. Terminals that subscribe to both terrestrial and satellite systems may be operative to receive and display respective current cumulative usage information for a respective one of the satellite and terrestrial systems. Terminals that operate according to rate plans that include special time of day (e.g., off-peak) or time of week (e.g., weekend) rates may receive and display respective usage information for a respective one of these categories of service. As illustrated in FIGS. 12A–B, separate indications for each type of usage may be provided at a terminal 300. For example, home area usage, roaming area usage, terrestrial system usage, and satellite system usage may be presented using separate distinguishing indicia 321a–d. Additional information may be provided as well, such as a alphanumeric or other indication of the month, quarter, billing period or other period the usage information pertains.

Figure 13:
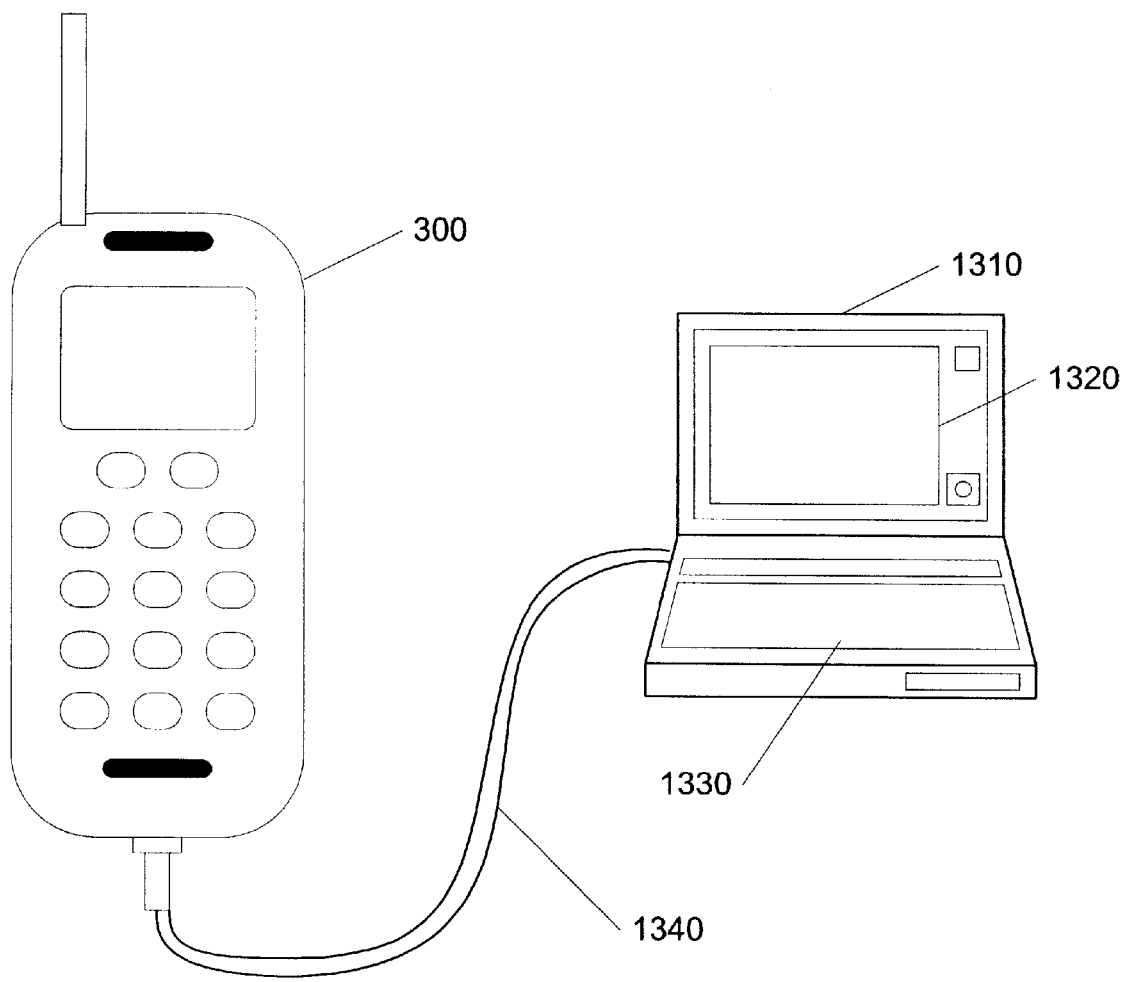
FIG. 13 illustrates use of an external device to indicate usage according to another aspect of the present invention.

As illustrated in FIG. 13, indication of current cumulative usage need not be limited to the terminal 300. As illustrated, a terminal 300 may convey information via an external link 1340 to a device such as a laptop computer 1310. The computer 1310 may, for example, display usage information on its screen 1320 under control of a keyboard 1330. It will be appreciated that an external device such as the computer 1310 may also be used to program usage-related features of the terminal 300, such as thresholds for detecting excessive usage or for detecting excessive deviation between extrapolated and actual usage, as described above.

Although methods and apparatus are illustrated herein as embodied in a radiotelephone device, i.e., a cell phone, the present invention is not limited to such devices. For example, the present invention may be embodied in wireless-capable laptop computers, notebook computers, personal digital assistants (PDAs), and the like.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A terminal for communicating with a wireless communications system, the terminal comprising:
   means for receiving current cumulative usage information from the wireless communications system;
   means for receiving an indication that current cumulative usage information will not be communicated to the terminal;
   means, responsive to said means for receiving an indication that current cumulative usage information will not be communicated, for extrapolating current cumulative usage; and
   means, responsive to said means for receiving current cumulative usage information and to said means for extrapolating current cumulative usage, for indicating current cumulative usage for a subscriber to a user.

2. A terminal according to claim 1, wherein said means for receiving current cumulative usage information comprises means for receiving current cumulative usage information at registration of the terminal.

3. A terminal according to claim 1, wherein said means for receiving current cumulative usage information comprises means for receiving current cumulative usage information at least one of during a call and the end of a call.

4. A terminal according to claim 1, wherein said means for receiving current cumulative usage information comprises means for receiving current cumulative usage information in at least one of a Registration Response message, a Control message, and a Release message.

5. A terminal according to claim 1, wherein said means for receiving current cumulative usage information comprises means for receiving current cumulative usage information from at least one of a terrestrial base station and a satellite station.

6. A terminal according to claim 1, wherein said means for receiving current cumulative usage information comprises means for receiving a plurality of usage indications, a respective one of which is associated with a respective type of usage.

7. A terminal according to claim 6, wherein said means for indicating comprises means for providing a plurality of usage indications to a user.

8. A terminal according to claim 6, wherein said means for indicating comprises means for displaying different usage in different forms.

9. A terminal according to claim 1, wherein the current cumulative usage information comprises at least one of a voice call usage indication, a data call usage indication, a home area usage indication, a roaming usage indication, a geographic area usage indication, a system type usage indication, a terrestrial system usage indication, a satellite system usage indication, a time of day usage indication, and a time of week usage indication.

10. A terminal according to claim 1, wherein said means for receiving current cumulative usage information comprises means for receiving current cumulative usage information in at least one of time units and monetary units.

11. A terminal according to claim 1, wherein said means for receiving current cumulative usage information comprises means for receiving current cumulative usage information indicating remaining unused wireless communication services.

12. A terminal according to claim 11, further comprising means for converting received current cumulative usage information to a measure of remaining unused wireless communications services, and wherein said means for indicating comprises means, responsive to said means for converting, for indicating remaining unused wireless communication services.

13. A terminal according to claim 1, wherein said means for receiving an indication that current cumulative usage information will not be communicated comprises means for receiving the indication that current cumulative usage information will not be communicated on at least one of a broadcast channel and a point-to-point channel.

14. A terminal according to claim 1, further comprising:
means for determining a difference between an extrapolated usage and a current cumulative usage information received from a wireless communications system, and
means for indicating the difference to a user.

15. A terminal according to claim 14, wherein said means for indicating the difference comprises means for indicating the difference if the difference exceeds a predetermined threshold.

16. A terminal according to claim 1, wherein said means for indicating comprises means for indicating that the indicated usage is extrapolated.

17. A terminal according to claim 1, wherein said means for extrapolating comprises means for extrapolating a new usage value from a previous usage value based on a call duration.

18. A terminal according to claim 1, wherein said means for indicating comprises means for providing at least one of a visual indication and an audible indication.

19. A terminal according to claim 1, wherein said means for indicating comprises means, responsive to a user input, for controlling presentation of the usage indication.

20. A terminal according to claim 19, wherein said means for controlling comprises a keypad.

21. A terminal according to claim 1, further comprising means, responsive to the received current cumulative usage information, for detecting if a usage meets a predetermined criterion.

22. A terminal according to claim 21, wherein said means for detecting comprises means for detecting whether the usage exceeds a predetermined threshold.

23. A terminal according to claim 21, wherein said means for indicating comprises means, responsive to said means for detecting, for indicating that the usage has met a predetermined criterion.

24. A terminal according to claim 21, further comprising means for receiving the predetermined criterion from the wireless communications system.

25. A terminal according to claim 24, wherein said means for receiving the predetermined criterion comprises means for receiving a measure of a unit of allocated services.

26. A terminal according to claim 24, wherein said means for receiving the predetermined criterion comprises means for receiving the predetermined criterion as part of an over-the-air-interface activation teleservice (OATS) procedure.

27. A terminal according to claim 24, further comprising means for receiving an indication of a cost associated with meeting the predetermined criterion, and wherein said means for indicating indicates the cost associated with meeting the predetermined criterion.

28. A terminal according to claim 1, wherein said means for indicating comprises means for providing at least one of a visual indication and an auditory indication to a user at the terminal.

29. A terminal according to claim 1, wherein said means for indicating comprises means for communicating usage information to an external device connected to the terminal.

30. A terminal according to claim 1, further comprising:
means for receiving usage charge rate information; and
means for indicating usage charge rate to a user.

31. A terminal according to claim 1, further comprising means for storing current cumulative usage information.

32. A terminal according to claim 31, wherein said means for storing comprises means for storing current cumulative usage information on a smart card.

33. In a terminal for communicating with a wireless communications system, a method of monitoring usage comprising the steps of:
receiving current cumulative usage information from the wireless communications system;
indicating current cumulative usage for a subscriber to a user based on the received current cumulative usage information;
receiving an indication that current cumulative usage information will not be communicated to the terminal;
extrapolating usage, responsive to receiving an indication that current cumulative usage information will not be communicated, and indicating extrapolated usage to a user.

34. A method according to claim 33, wherein said step of receiving current cumulative usage information comprises the step of receiving current cumulative usage information at registration of the terminal.

35. A method according to claim 33, wherein said step of receiving current cumulative usage information comprises the step of receiving current cumulative usage information at at least one of during a call and at the end of the call.

36. A method according to claim 33, wherein said step of receiving current cumulative usage information comprises the step of receiving current cumulative usage information in at least one of a Registration Response message, a Control message, and a Release message.

37. A method according to claim 33, wherein said step of receiving current cumulative usage information comprises the step of receiving current cumulative usage information from at least one of a terrestrial base station and a satellite station.

38. A method according to claim 33, wherein said step of receiving current cumulative usage information comprises the step of receiving a plurality of usage indications, a respective one of which is associated with a respective type of usage.

39. A method according to claim 38, wherein said step of indicating comprises the step of providing a plurality of usage indications to a user.

40. A method according to claim 33, wherein said step of indicating comprises the step of displaying different usage in different forms.

41. A method according to claim 33, wherein the current cumulative usage information comprises at least one of a voice call usage indication, a data call usage indication, a home area usage indication, a roaming usage indication, a geographic area usage indication, a system type usage indication, a terrestrial system usage indication, a satellite system usage indication, a time of day usage indication, and a time of week usage indication.

42. A method according to claim 33, wherein said step of receiving current cumulative usage information comprises the step of receiving current cumulative usage information in at least one of a time unit and a monetary unit.

43. A method according to claim 33, wherein said step of receiving current cumulative usage information comprises the step of receiving current cumulative usage information indicating remaining unused wireless communication services.

44. A method according to claim 33, wherein said step of indicating is preceded by the step of converting received current cumulative usage information to a measure of remaining unused wireless communications services, and wherein said step of indicating comprises the step of indicating remaining unused wireless communication services.

45. A method according to claim 33, wherein said step of receiving an indication that current cumulative usage information will not be communicated comprises the step of receiving an indication that current cumulative usage information will not be communicated, on at least one of a broadcast channel and a point-to-point channel.

46. A method according to claim 33, further comprising the step of:
determining a difference between an extrapolated usage and cumulative usage information received from the wireless communications system, and
indicating the difference to a user.

47. A method according to claim 46, wherein said step of indicating the difference comprises the step of indicating the difference if the difference exceeds a predetermined threshold.

48. A method according to claim 33, wherein said step of indicating comprises the step of indicating that the indicated usage is extrapolated.

49. A method according to claim 33, wherein said step of extrapolating comprises the step of extrapolating a new usage value from a previous usage value based on a call duration.

50. A method according to claim 33, wherein said step of indicating comprises the step of providing at least one of visual indication and an audible indication.

51. A method according to claim 33, wherein said step of indicating comprises the step of controlling presentation of the usage indication responsive to a user input at the terminal.

52. A method according to claim 51, wherein said step of controlling comprises a accepting a user input at a keypad.

53. A method according to claim 33, further comprising the step of detecting if a usage meets a predetermined criterion.

54. A method according to claim 53, wherein said step of detecting comprises the step of detecting whether the usage exceeds a predetermined threshold.

55. A method according to claim 53, wherein said step of indicating comprises the step of indicating that the usage has met a predetermined criterion.

56. A method according to claim 53, further comprising step of receiving the predetermined criterion from the wireless communications system.

57. A method according to claim 56, wherein said step of receiving the predetermined criterion comprises the step of receiving a measure of a unit of allocated services.

58. A method according to claim 56, wherein said step of receiving the predetermined criterion comprises the step of receiving the predetermined criterion as part of an over-the-air-interface activation teleservice (OATS) procedure.

59. A method according to claim 56, further comprising the step of receiving an indication of a cost associated with meeting the predetermined criterion, and wherein said step of indicating comprises the step of indicating the cost associated with meeting the predetermined criterion.

60. A method according to claim 33, wherein said step of indicating comprises the step of providing at least one of a visual indication and an auditory indication to a user at the terminal.

61. A method according to claim 33, wherein said step of indicating comprises the step of communicating usage information to an external device connected to the terminal.

62. A method according to claim 33, further comprising the step of:
receiving usage charge rate information; and
indicating usage charge rate to a user.

63. A method according to claim 33, further comprising the step of storing current cumulative usage information.

64. A method according to claim 63, wherein said step of storing comprises the step of storing current cumulative usage information on a smart card.

65. A method according to claim 63, further comprising the step of communicating stored current cumulative usage information to the wireless communications system.

* * * * *

UNITED STATES PATENT AND TRADEMARK OFFICE
CERTIFICATE OF CORRECTION

PATENT NO. : 6,493,547 B1 Page 1 of 1
DATED : December 10, 2002
INVENTOR(S) : Alex Krister Raith It is certified that error appears in the above-identified patent and that said Letters Patent is hereby corrected as shown below:

Column 13,
Line 1, insert -- at -- following "at".

Signed and Sealed this

Twenty-fourth Day of February, 2004

JON W. DUDAS
*Acting Director of the United States Patent and Trademark Office*